United States Patent [19]
Defatte

[11] Patent Number: 6,101,699
[45] Date of Patent: Aug. 15, 2000

[54] METHOD OF REPAIRING BOLTS WITH REPLACEABLE THREADS

[76] Inventor: Robert G. Defatte, W4157 Scenic Rd., Campbellsport, Wis. 53010

[21] Appl. No.: 09/105,817

[22] Filed: Jun. 26, 1998

Related U.S. Application Data

[62] Division of application No. 08/752,974, Dec. 2, 1996, Pat. No. 5,807,589.
[51] Int. Cl.[7] .......................................... B23P 6/00
[52] U.S. Cl. .................................. 29/402.08; 29/525.02; 29/525.11
[58] Field of Search ...................................... 425/186, 233, 425/435; 264/311; 411/432; 29/525.02, 525.11, 402.08

[56] References Cited

U.S. PATENT DOCUMENTS

| | | | |
|---|---|---|---|
| 3,119,298 | 1/1964 | Brown | 411/396 |
| 4,022,099 | 5/1977 | Ballantyne | 85/1 |
| 4,126,338 | 11/1978 | Coel et al. | 285/330 |
| 4,238,537 | 12/1980 | Kerr | 264/310 |
| 4,931,008 | 6/1990 | Morrison | 411/432 |
| 5,118,236 | 6/1992 | Rodriguez, II et al. | 411/383 |

*Primary Examiner*—P. W. Echols
*Assistant Examiner*—John Hong
*Attorney, Agent, or Firm*—Donald Cayen

[57] ABSTRACT

A screw with replaceable threads is particularly useful to releasably join the spiders of rotational molding machines. The screw comprises a master bolt that passes through a first spider, and a tip that is removably assembled to the master bolt. The tip is threaded to selectively engage and disengage a receiver on the second spider. When the tip is assembled to the master bolt, the screw is captured in the first spider. When the tip has worn through use, it can be replaced without disturbing the master bolt. Similarly, when the tip seizes to the receiver, the tip and receiver are replaceable as a unit without disturbing the master bolt.

3 Claims, 3 Drawing Sheets ature of the claims is the test of patentability of the invention. The preferred embodiment of the invention is disclosed in detail. Modifications to it can be made within the spirit and scope of the invention by those who are skilled in the art.

METHOD OF REPAIRING BOLTS WITH REPLACEABLE THREADS

This is a divisional of U.S. patent application Ser. No. 08/752,974, filed on Dec. 2, 1996, now U.S. Pat. No. 5,807,589.

BACKGROUND OF THE INVENTION

1. Field of the Invention

This invention pertains to fasteners, and more particularly to threaded fasteners in which the threads are replaceable on a shank.

2. Description of the Prior Art

Threaded fasteners in the form of bolts and screws are well known and are in widespread use. Such fasteners are usually in one piece, and they invariably include a head and a threaded shank. In many instances, the shank is threaded for its full length. In other cases, only a portion of the shank is threaded.

The industrial process of rotational molding is a particularly severe application for threaded fasteners. Large screws, which typically have a 0.75 inch diameter and an eight-inch length, are used to releasably join two large mold supporting spiders to each other. The screw shanks pass through clearance holes in a first spider. The screw threads, which are usually hardened, engage receivers in the other spider. At the start of a molding cycle, the screws are tightened into their associated receivers to draw the spiders toward each other and close the molds. At the end of the cycle, the screws are reversed to completely disengage from the receivers. The spiders can then be separated from each other and the molds opened. After the workpieces have been removed from the molds, the process is repeated. The repeated turning of the screws causes their threads to wear relatively quickly, even though they are hardened. Consequently, the screws, which are expensive, must periodically be replaced. In addition, debris and coolant from the machinery can enter the receivers. As a result, the screw threads occasionally seize to the receivers. When that occurs, the screw shank must be flame cut in two. The entire screw, as well as the receiver, are discarded. That remedy is expensive, not only from the standpoint of material loss but also from the associated unproductive downtime.

A further problem with prior screws used in the rotational molding process is that they tend to fall out of the first spider when the spiders are separated at the end of a molding cycle. The worker must then either search for the screw or obtain a new one.

In some other applications of threaded fasteners, it is desirable or even necessary to employ multi-component fasteners. Such applications include railroad tracks; the bolt of U.S. Pat. No. 1,208,550 is an example. Another application of multi-part fasteners are self-tapping screws such as are shown in U.S. Pat. No. 4,022,099 and 4,900,207. U.S. patent 4,126,338 shows a housing end and replaceable threaded sleeve that are useful for coupling a fluid conduit. Canada patent 715,793 describes a shear bolt that includes a stud that threads into a sleeve.

None of the fasteners of the foregoing patents is suitable for use with rotational molding equipment. Therefore, a need exists for improvements in the spider joining screws that are used in rotational molding.

SUMMARY OF THE INVENTION

In accordance with the present invention, a screw with replaceable threads is provided that greatly reduces the expenses associated with rotational molding processes. This is accomplished by apparatus that includes a master bolt in combination with a threaded tip.

The master bolt has a head and a shank. The shank is long enough to pass through the particular mold supporting spider with which the screw of the invention is to be used. There is a bore in the shank end surface. A cross hole is drilled transversely through the shank wall at the bore. The location of the cross hole is accurately controlled relative to the shank end surface.

The tip has a pilot on one end and threads on the other end. The pilot is sized to fit snugly in the master bolt bore. There is a shoulder between the pilot and the threads, and a cross hole in the pilot. The distance between the cross hole and the shoulder of the tip is the same as the distance between the cross hole and shank end surface of the master bolt. Consequently, when the tip pilot is inserted into the master bolt bore until the tip shoulder abuts the shank end surface, the cross holes on the two parts lie in the same plane. The two parts are rotated relative to each other until the cross holes align. Then a pin can be inserted through the cross holes of the two parts.

In use, the master bolt shank is passed through a first spider. The tip pilot is inserted into the shank bore, and the tip is pinned to the master bolt. The pin is long enough to cooperate with the master bolt head to capture the master bolt on the first spider such that the master bolt does not fall out of the first spider during operation of the molding equipment. The resulting multi-component screw is used in generally the same manner as the prior one-piece screws.

However, when the threads of the tip wear, it is necessary only to remove the pin to separate the tip from the master bolt, and only the tip need be discarded. A new tip is then inserted into and pinned to the master bolt. Similarly, when a tip thread seizes to a receiver, the tip is unpinned from the master bolt, and the receiver is disconnected from its spider. The tip and receiver are discarded as a unit. A new tip is pinned to the master bolt, and a new receiver is installed in the spider. Downtime of the molding machine during tip and spider replacement is substantially reduced compared with prior screws.

The method and apparatus of the invention, using a multi-component screw, thus greatly increases the productivity and economy of rotational molding machines. The threaded tip of the screw can be quickly replaced on the master bolt when necessary, even though the screw functions in the same manner as conventional screws during normal operation of the molding equipment.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
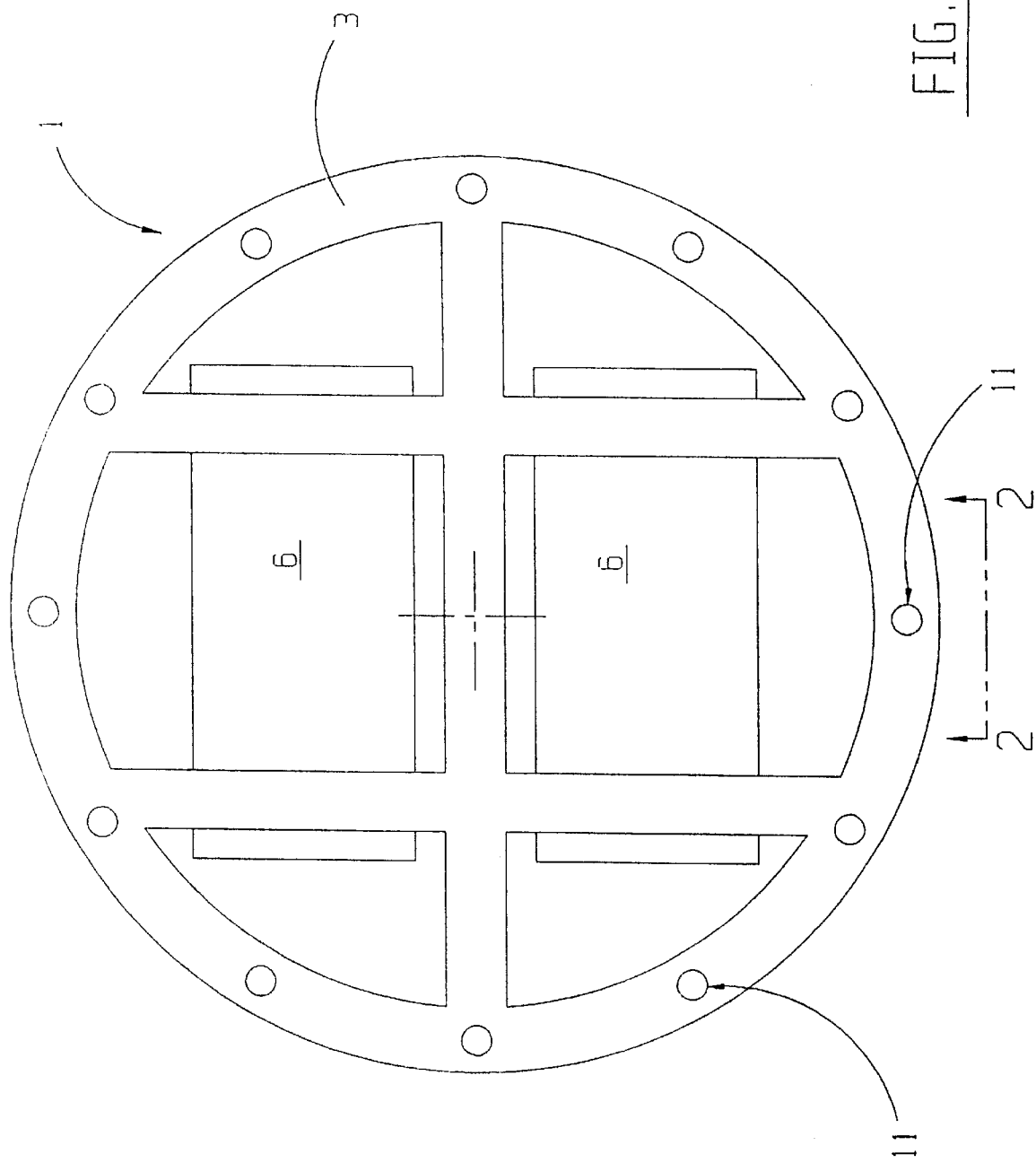
FIG. 1 is a schematic representation of a portion of a typical rotational molding machine that employs the present invention.
Figure 2:
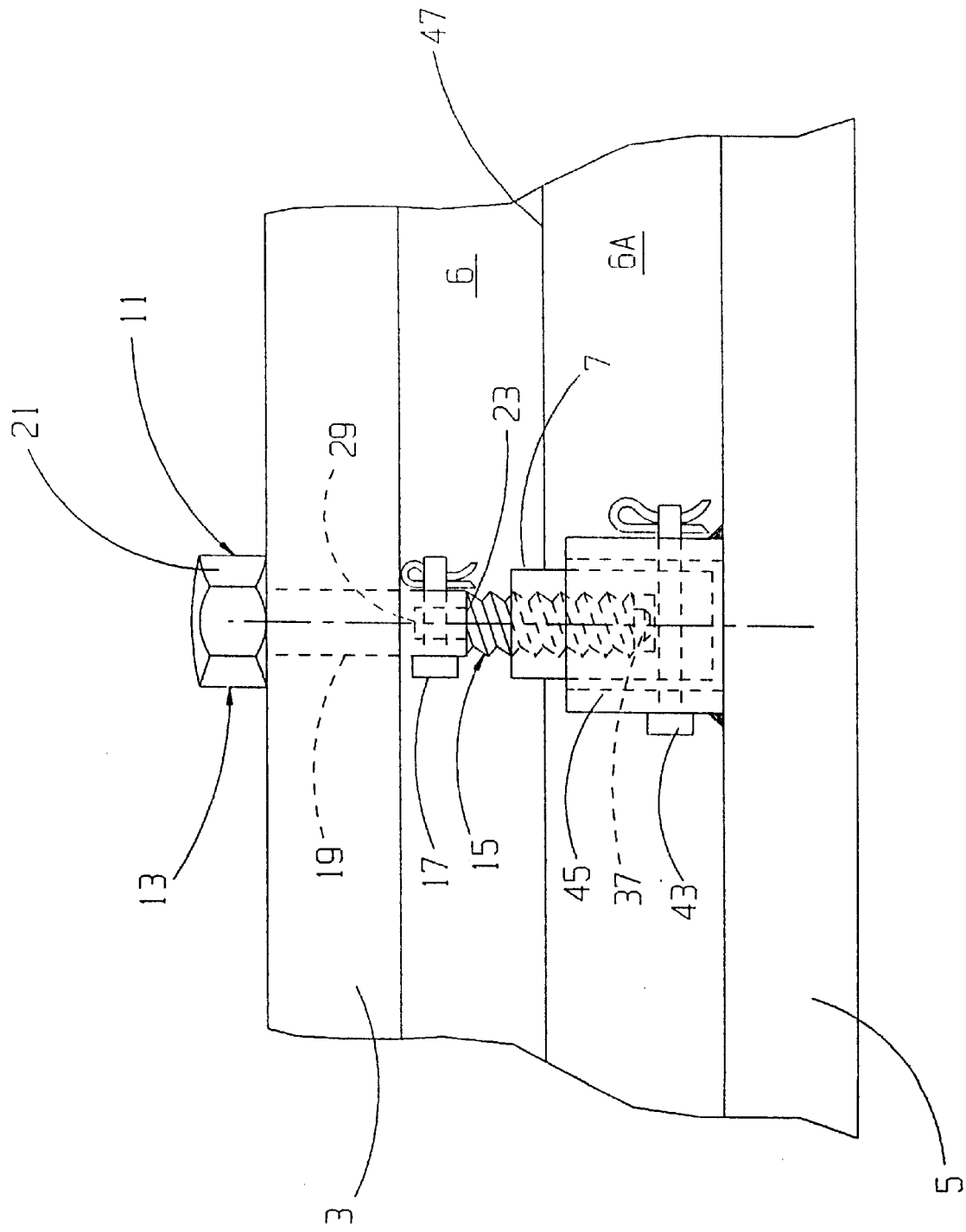
FIG. 2 is a view on an enlarged scale taken along line 2—2 of FIG. 1.

Referring to FIGS. 1 and 2, reference numeral 1 indicates a portion of a typical rotational molding machine. The rotational molding machine 1 has a top spider 3 and a bottom spider 5. The spiders 3 and 5 support respective halves 6 and 6A of large molds. In FIG. 1, two molds 6, 6A are shown, but it will be understood that the invention is not limited to a particular size or type of rotational molding machine.

Figure 4:
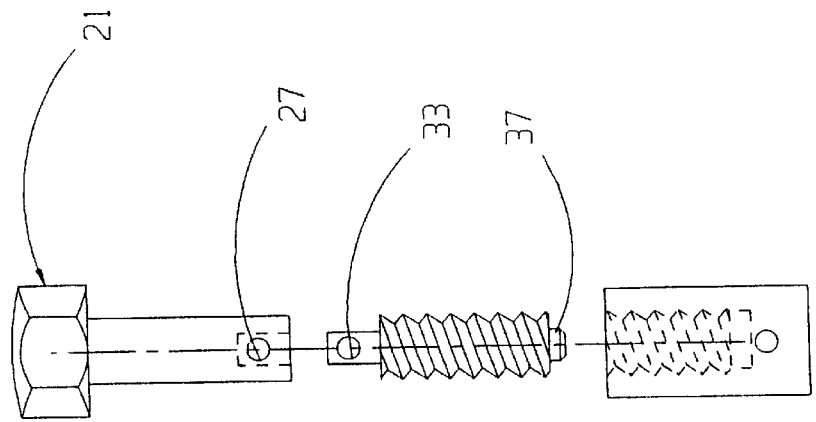
FIG. 4 is a side view of FIG. 3.
Figure 3:
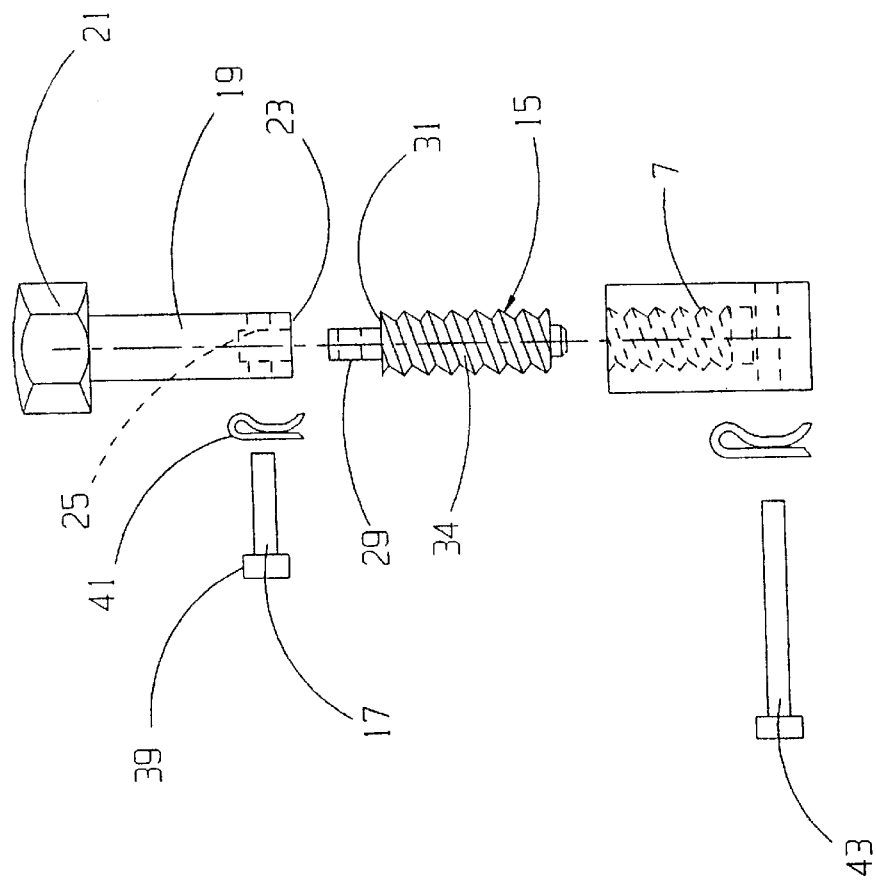
FIG. 3 is an exploded front view of the screw with replaceable threads according to the invention.

In accordance with the present invention, and also looking at FIGS. 3 and 4, a number of screws 11 with replaceable tips are used to releasably join the spiders 3 and 5 to each other. Each screw with replaceable tip 11 is comprised of a master bolt 13, a tip 15, and a pin 17. The master bolt 13 is made as a cylindrical shank 19 having a head 21 on one end thereof. The length of the master bolt shank 19 can vary to suit the spiders of different rotational molding machines 1. Preferably, the head 21 is a hex head. The other end 23 of the shank 19 has a bore 25. A cross hole 27 is at an accurately located distance from the shank end 23. The distance from the cross hole 27 to the shank end 23 is the same for all length shanks.

The tip 15 has a first end with a pilot 29 of slightly smaller diameter than the diameter of the master bolt bore 25. The pilot 29 terminates in a shoulder 31. A cross hole 33 in the pilot has the same diameter as the cross hole 27 in the master bolt 13. The tip cross hole 33 is located at the same distance from the shoulder 31 as the hole 27 is located from the master bolt end 23. The tip is threaded at 34 between the shoulder and a guide 37 at the tip second end. The guide 37 is shown as being cylindrical in shape with a diameter less than the diameter of the threads 34. However, it will be appreciated that the guide can have a tapered surface, if desired.

The pin 17 is sized to fit snugly in the cross holes 27 and 23. In the illustrated construction, the pin is shown as a cylindrical pin with a head 39 and a cotter pin 41. However, a hair pin or ball-and-detent pin also are acceptable.

As best shown in FIG. 2, the screw 11 is used by choosing a master bolt 13 having the correct length shank 19 for the particular rotational molding machine 1. The master bolt shank is passed through a clearance hole in the top spider 3 until the head 21 contacts the spider. The tip pilot 29 is inserted into the bore 25 of the master bolt 13 until the tip shoulder 31 abuts the master bolt end 23. In that condition, the cross holes 27 and 33 are coplanar. Rotation of the master bolt and tip relative to each other enables the cross holes to become axially aligned for inserting the pin 17 through them. The screw 11 is thus assembled, and it is captured in the top spider by the cooperation of the head 21 and pin 17.

With the screws 11 captured in the spider 3, the screws are used on the rotational molding machine 1 in generally the same way as conventional screws. That is, the threads 34 are engagable with the threads of associated receivers 7 that are part of the bottom spider 5. In the particular example of molding machine 1 shown, each receiver 7 is inside and is connected by a pin 43 to an associated short tube 45. In turn, the tube 45 is welded to the bottom spider. At the beginning of a molding cycle, power wrenches, not illustrated, drive the screw heads 21 to fully engage the screws 11 with their respective receivers 7 in a manner that closes the molds 6 and 6A. At the end of the cycle, the power wrenches reverse the screws to completely disengage the threads 34 from the receivers. The spiders are separated, thereby separating the mold along the parting line 47. The master bolt head 21 and the pin 17 cooperate to hold the screw from falling out of the top spider when the spiders are separated. After the workpieces have been removed from the molds, the spiders are brought together, and the screws are again driven into full engagement with their associated receivers. The guides 37 on the tips 15 facilitate initial entry of the tip threads back into the receivers.

When the tip threads 34 of a screw with replaceable threads 11 become worn, the pin 17 is removed. The tip 15 is then immediately separable from the master bolt 13 and discarded. A new tip is then inserted into and pinned to the master bolt. It is thus not necessary to replace the entire screw 11 when the threads wear.

Similarly, when a tip thread 34 seizes to its receiver 7, removing the pins 17 and 43 enables the tip 15 and receiver to be removed as a unit from the spiders 3 and 5 without requiring any flame cutting of the screw or other non-productive effort. A new tip and receiver can be installed quickly and with minimal interruption of production. In addition, the cost of the master bolt 13 is saved.

In summary, the results and advantages of rotational molding equipment can now be more fully realized. The screw with replaceable threads 11 enables high production to be maintained from the equipment despite the severe service to which they are exposed. This desirable result comes from using the combined functions of the replaceable tip 15 and the pin 17. The pin and master bolt head 21 cooperate to prevent the screw from falling out of a spider 3 during production. The tip is easily and quickly removable from the master bolt 13 when the tip is worn or seized to a spider receiver 7 merely by removing the pin from the cross holes 27 and 23. A replacement tip is equally easily assembled to the master bolt by inserting the tip pilot 29 into the master bolt bore 25 until the tip shoulder 31 abuts the master bolt end 23. Aligning the cross holes enables reinsertion of the pin.

It will also be recognized that in addition to the superior performance of the invention, its construction is such as to cost but little more than traditional screws. The great increase in productivity available to rotational molding equipment resulting from the screw with replaceable threads amply justifies its cost.

Thus, it is apparent that there has been provided, in accordance with the invention, a screw with replaceable threads that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations of the invention as fall within the spirit and broad scope of the appended claims.

I claim:

1. A method of repairing bolts that pass through top and bottom mold carrying spiders of a rotational molding machine and that engage and disengage respective receivers on the bottom spider and thereby join and release, respectively, the spiders to each other in a manner that wears threads on the bolts and that causes the bolts to seize in the receivers comprising the steps of:

a. passing the shanks of a plurality of master bolts through associated holes in the top spider that are aligned with respective receivers in the bottom spider;

b. assembling first threaded tips one to each master bolt shank;

c. selectively turning the master bolts and engaging and disengaging the tips with the associated receivers;

d. removing a first tip from the associated master bolt when the threads of the first tip have worn; and e. assembling a second tip to the master bolt.

2. The method of claim 1 wherein the step of assembling the first threaded tip to the master bolt comprises the steps of:

a. removably inserting a pin through the master bolt shank and the tip; and b. capturing the master bolt on the top spider by means of the pin.

3. A method of repairing bolts that pass through top and bottom mold carrying spiders of a rotational molding machine and that engage and disengage respective receivers on the bottom spider and thereby join and release, respectively, the spiders to each other in a manner that wears threads on the bolts and that causes the bolts to seize in the receivers comprising the steps of:

a. passing the shanks of a plurality of master bolts through associated holes in the top spider that are aligned with respective receivers in the bottom spider;

b. assembling first threaded tips one to each master bolt shank;

c. selectively turning the master bolts and engaging and disengaging the tips with the associated receivers;

d. removing a first tip from a selected master bolt and removing the associated receiver from the bottom spider as a unit when the first tip of the selected master bolt has seized to the associated receiver;

e. assembling a second tip to the selected master bolt; and f. connecting a new receiver associated with the second tip to the bottom spider.

* * * * *